(12) United States Patent
Lenstra

(10) Patent No.: US 6,446,205 B1
(45) Date of Patent: Sep. 3, 2002

(54) CRYPTOSYSTEMS WITH ELLIPTIC CURVES CHOSEN BY USERS

(75) Inventor: Arjen K. Lenstra, Mendham, NJ (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/209,436

(22) Filed: Dec. 10, 1998

(51) Int. Cl.[7] .................................................. H04L 9/00
(52) U.S. Cl. ...................... 713/168; 713/171; 380/255; 380/277; 380/278; 380/282
(58) Field of Search .................. 713/168, 171; 380/255, 277, 278, 282

(56) References Cited

U.S. PATENT DOCUMENTS

| | | | |
|---|---|---|---|
| 5,351,297 A | | 9/1994 | Miyaji et al. |
| 5,442,707 A | | 8/1995 | Miyaji et al. |
| 5,497,423 A | * | 3/1996 | Miyaji .......................... 380/30 |
| 5,627,893 A | * | 5/1997 | Demytko ...................... 380/30 |
| 5,793,866 A | * | 8/1998 | Brown et al. .................. 380/2 |

OTHER PUBLICATIONS

Menezes et al., "Handbook of Applied Cryptography", 1996, sec.'s 4.53, 8.4.*

Lenstra, Arjen K., "Efficient Identity Based Parameter Selection for Elliptic Curve Cryptosystems", Information Security and Privacy, 4th Australasian Conference, pp. 294–302 (Apr. 7–9, 1999).

Menezes, Alfred J. et al., "Elliptic Curve Cryptosystems and Thier Implementation", Journal of Cryptology, vol. 6, No. 4, pp. 209–224 (Autumn 1993).

Koblitz, Neal, "Constructing Elliptic Curve Cryptosystems in Characteristic 2", Advances In Cryptology—Crypto '90 Proceedings, Santa Barbara, CA, pp. 156–167 (Aug. 11–15, 1990).

Schoof, René, "Counting Points on Elliptic Curves Over Finite Fields", Journal de Théorie des Nombres, vol. 7, No. 1, pp. 219–254 (1995).

International Search Report, dated Apr. 5, 2000.

* cited by examiner

*Primary Examiner*—Thomas R. Peeso
(74) *Attorney, Agent, or Firm*—Morgan & Finnegan, LLP

(57) ABSTRACT

Participants in a cryptosystem select their own elliptic curve and finite field, rather than using a centrally chosen elliptic curve. The curve is chosen from a predetermined set of elliptic curves expressed as Weierstraβ model equations. The public key is based on a participant's unique ID, which must be exchanged during communication setup for non-cryptographic reasons, and a randomly chosen bitstring having a length based on security considerations. The public key can be readily constructed from parameters and mapping functions which are known system-wide and from a small amount of participant dependent data.

17 Claims, 12 Drawing Sheets

B = 85, s = 455055716 gives rise to:
  $b_1 = 173$,
  p = 8072444782687500527444170462865827339856177762963639,
  E with discriminant −7, $y^2 = x^3 - 35x - 98$,
  q = 1441507996908482237043601802394607926578187124913,
  Q = (2512878470278047291167940499520496715863902547 92903,
      7246912952590713795025845177990797420836666398638756).

FIG. 12A

B = 85, s = 950059835 gives rise to:
  $b_1 = 142$,
  p = 7986988830338331440055612542829501917521 3486429187,
  E with discriminant −43, $y^2 = x^3 - 13760x + 621264$,
  q = 4698228723728430258856241629031040156305726415091,
  Q = (2928353707193338881742844568514864683030667001971,
      7047642223972091497497080753452592774483 3981524159).

FIG. 12B

B = 150, s = 61464957 gives rise to:
  $b_1 = 206$,
  p = 23133285877570946638265848056806893103600470881177176995892110 89006766594007346499487 11547,
  E with discriminant −11, $y^2 = x^3 - 9504x - 365904$,
  q = 15422190585047297758843898704537928735733647216762578145120243 65051849291079766554014 9877,
  Q = (95764486351158380900637146596853276835552866743004257183930 63202369906084721723359 1184755,
  12940916778764505765510139032970006473968781712456219358081207 1979017125038364212491033289)

FIG. 12C

B = 150, s = 956981329 gives rise to:
  $b_1 = 188$,
  p = 23237098998174945413727957662354441213242506321731573552672 4278632459767369748912493 7322 14423,
  E with discriminant −67, $y^2 = x^3 - 117920x + 15585808$,
  q = 23237098998174945413727957662354441213242506321651761294427 3663423990810618383138594 713073687,
  Q = (12187934129358255941689626567083639317112981593237487090030 14952282580034057526801 076403841,
  611548908348462718537131570680050203827334872005642128945074233758 05200089077050515473 7250)

FIG. 12D

CRYPTOSYSTEMS WITH ELLIPTIC CURVES CHOSEN BY USERS

BACKGROUND OF THE INVENTION

The present invention relates to cryptographic systems, and, more particularly, is directed to elliptic curve cryptosystems in which participants pick their own elliptic curves rather than using a centrally chosen elliptic curve.

In a conventional elliptic curve cryptosystem, as shown in FIG. 1, a central facility selects a finite field, an elliptic curve, a generator of an appropriate subgroup of the group of points of the elliptic curve over the finite field, and the order of that generator. The central facility distributes these data among the participants in the cryptographic system. Each participant then selects a secret key, computes a corresponding public key, and may optionally obtain certification for its public key. The objective of the certificate is to make one party's public key available to other parties in such a way that those other parties can independently verify that the public key is valid and authentic. An advantage of the conventional system is that, while a lot of computation is required to obtain both the cardinality of the group of points of an elliptic curve over a finite field, and to find an elliptic curve for which this cardinality satisfies the security requirements, this computation need not be performed by participants—which would be very burdensome—as the computation is performed once by the central facility.

Conventional elliptic curve cryptosystems are used in the same applications as public key cryptosystems, such as authentication, certification, encryption/decryption, signature generation and verification.

As shown in FIG. 2, to use the conventional elliptic curve cryptosystem, two parties wishing to communicate exchange their cryptographic data, and then proceed with their communication, such as a signature scheme or a data encryption/decryption scheme. Advantageously, the number of bits exchanged during communication setup between parties is small.

A serious problem with the above-described conventional elliptic curve cryptosystem is that all participants are vulnerable to an attack on the centrally selected elliptic curve and finite field. That is, the system is vulnerable to a concentrated attack on the Discrete Logarithm problem in the group defined by the centrally selected elliptic curve and finite field.

Due to the desire that the cryptographic functionality be implementable in a small, inexpensive, low power device, it is considered impractical for each participant to choose its own elliptic curve. More particularly, allowing each participant to choose its own elliptic curve improves system security but results in a complicated system setup phase.

In conventional elliptic curve cryptosystems, the number of bits exchanged between parties during communication set-up is small, typically representing the parties' identities and the parts of their public keys that differ, i.e., not the curve and field shared by all parties. If each participant chose its own elliptic curve, another disadvantage would be that more data would have to be exchanged during communication set-up, specifically, the complete public keys including curves and fields would have to be exchanged during communication setup.

In view of these issues, there is a need to reduce the vulnerability to attack of elliptic curve cryptosystems.

SUMMARY OF THE INVENTION

In accordance with an aspect of this invention, there is provided a method of establishing a cryptographic system among participants, comprising the steps of: selecting a curve E from a predetermined set of elliptic curves, selecting a finite field, selecting a secret key, and obtaining a public key, wherein the steps of selecting a curve E, a finite field, a secret key and obtaining a public key are performed locally by each of the participants.

In an embodiment of the present invention, the predetermined set of elliptic curves are expressed as Weierstraβ model equations, specifically:

$y^2 = x^3 + 0x + 16;$ $y^2 = x^3 - 270x - 1512;$ $y^2 = x^3 - 35x - 98;$ $y^2 = x^3 - 9504x - 365904;$ $y^2 = x^3 - 608x + 5776;$ $y^2 = x^3 - 13760x + 621264;$ $y^2 = x^3 - 117920x + 15585808;$ and $y^2 = x^3 - 34790720x + 78984748304.$ In an embodiment of the present invention, the step of obtaining a public key includes selecting a bitstring s having a predetermined length based on security considerations, and obtaining a prime number p based on the selected bitstring s and a unique bitstring ID of the respective participant.

In accordance with an aspect of this invention, there is provided a method of reconstructing a public key for a participant in a cryptographic system, comprising the steps of forming intermediate integers a and b based on the participant's ID, obtaining a prime number p as a function of the intermediate integers a and b, selecting a curve E from a predetermined set of elliptic curves, picking a point Q on the selected curve based on the participant's ID, and constructing the public key from the prime number p, the selected curve E and the point Q.

In an embodiment of the present invention, the predetermined set of elliptic curves are expressed as Weierstraβ model equations.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 12A–12D are examples of public keys constructed according to the present invention.

DETAILED DESCRIPTION OF THE PREFERRED EMBODIMENTS

The present invention relates to elliptic curve cryptosystems in which each participant chooses its own elliptic curve, from a predetermined set of elliptic curve equations, and also chooses its own finite field. A central facility is not utilized for curve and field selection.

Because each participant chooses its own field, although only a small number of elliptic curve equations are available, a large number of elliptic curves are possible, thus, the security of the cryptosystem is high. More particularly, an attacker must compromise each participant's curve, one at a time, which advantageously isolates the security of a participant from the security of the other participants.

Since the predetermined set of elliptic curve equations is small, and is chosen to increase the simplicity of the group cardinality computation, the system setup is sufficiently straightforward to be useful.

Another advantage of the present system is that a participant can change its curve from time to time, independently of changes made by other participants.

In one embodiment of the present invention, a participant's public key includes identifying information which previously was sent but was not considered part of the cryptographic information. Since the identifying information need not be separately sent, overall message overhead is reduced, which needs to be considered when comparing the overhead of the present cryptosystem with other cryptosystems.

Another advantage of embedding the identifying information in the public key is that if an attacker misses the transmission with the public key, and obtains only subsequent transmissions, the security of the subsequent transmissions is enhanced.

Figure 1:
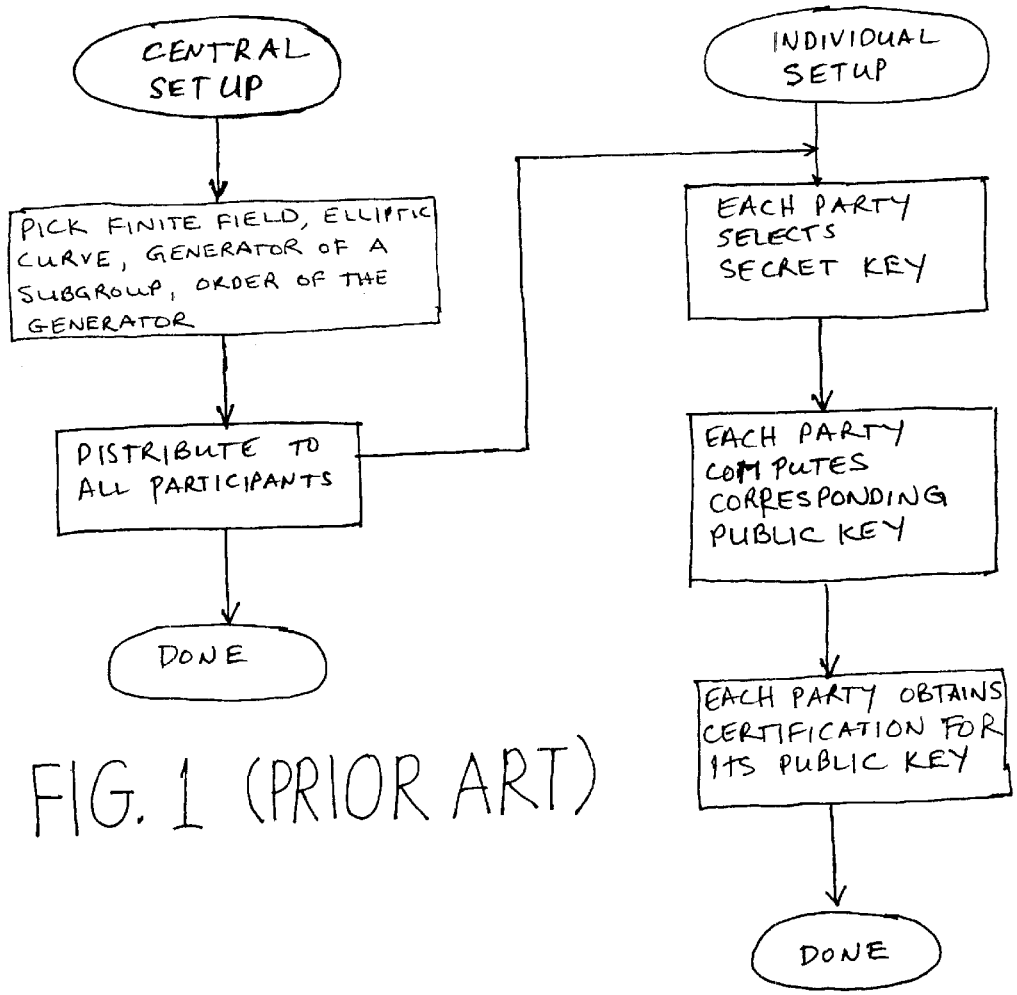
FIG. 1 is a flowchart of setup of a prior art cryptosystem.
Figure 2:
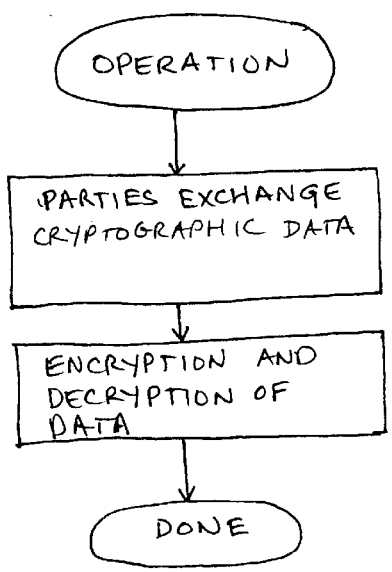
FIG. 2 is a flowchart of operation of a prior art cryptosystem.
Figure 3:
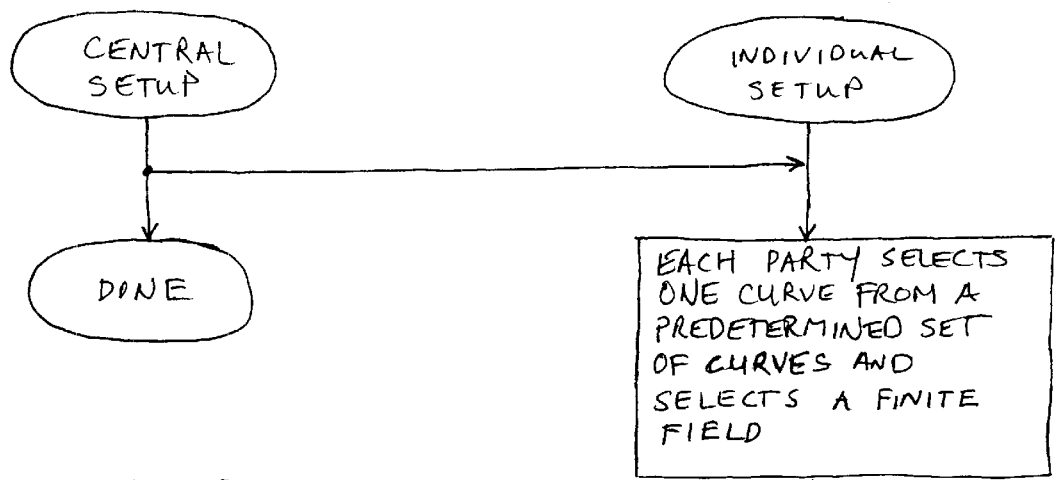
FIG. 3 is a flowchart of setup of a cryptosystem according to the present invention.

FIG. 3 illustrates an elliptic curve cryptosystem according to the present invention. As shown in FIG. 3, no functions are performed by the central facility, that is, a central facility is not needed, except for certification. Each participant chooses a curve and a finite field. Subsequently, each participant performs functions corresponding to those in the conventional system depicted in FIG. 1, namely, selecting a secret key, computing a corresponding public key and obtaining certification for its public key.

Figure 4:
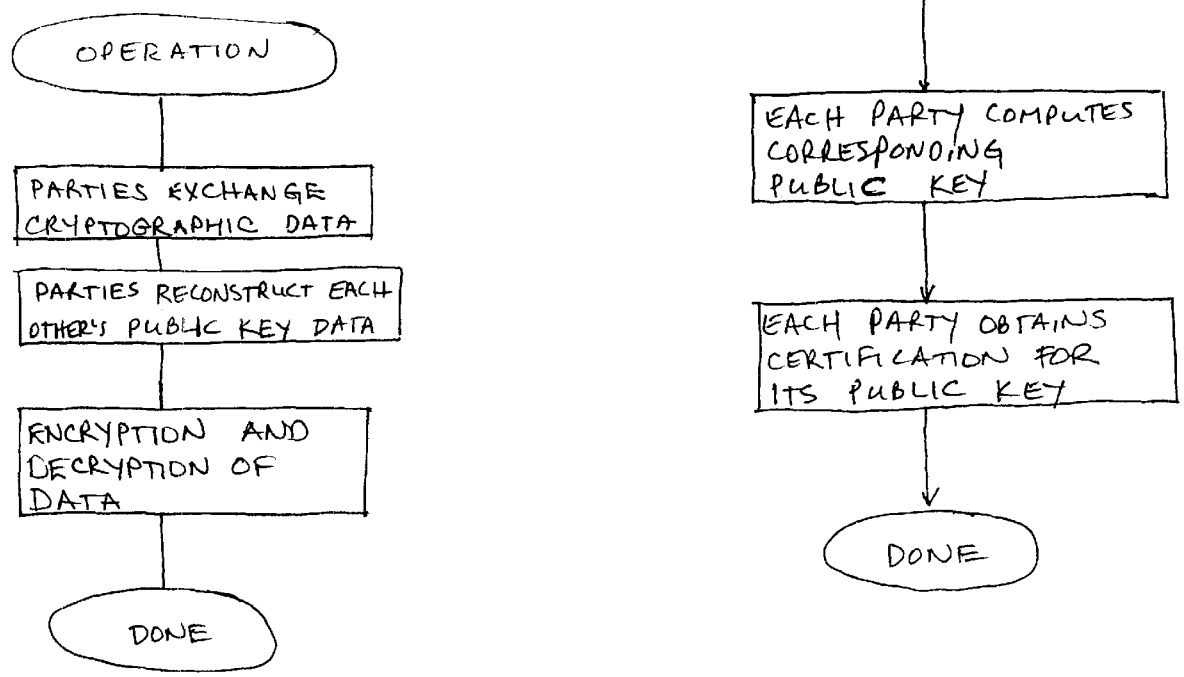
FIG. 4 is a flowchart of operation of a cryptosystem according to the present invention.

In operation, an elliptic curve cryptosystem according to the present invention functions as shown in FIG. 4. Parties wishing to communicate exchange cryptographic data, reconstruct each other's public key data, and then use the reconstructed keys in cryptographic protocols, such as a signature scheme or data encryption/decryption scheme.

Elliptic curves suitable for the present invention can be expressed as a Weierstraβ model, which has only two parameters, u and v, and is expressed as an equation of the form $$y^2 = x^3 + ux + v$$

The following equations are a predetermined set of Weierstraβ models from which each participant chooses its own elliptic curve equation:

$$y^2 = x^3 + 0x + 16$$

$$y^2 = x^3 - 270x - 1512$$

$$y^2 = x^3 - 35x - 98$$

$$y^2 = x^3 - 9504x - 365904$$

$$y^2 = x^3 - 608x + 5776$$

$$y^2 = x^3 - 13760x + 621264$$

$$y^2 = x^3 - 117920x + 15585808$$

$$y^2 = x^3 - 34790720x + 78984748304$$

When a prime number p is appropriately chosen by a participant, as described below, then at least one of the predetermined set of Weierstraβ model equations defines a non-supersingular elliptic curve E over the field F(p) containing p elements such that the cardinality of the group of points of E over F(p) contains a prime divisor q that is of the same order of magnitude as p. Furthermore, p and q are chosen such that q does not divide $p^m - 1$ for any positive integer m with $m*(\ln(m*\ln(p)))^2 \leq 0.02*(\ln(p))^2$. If p is sufficiently large, then this curve E is not susceptible to small subgroup attacks, which would apply if the cardinality would not have a large prime divisor, or to sub-exponential time attacks based on the Weil or Tate pairings, which would apply if q would divide $p^m - 1$ for relatively small m. The finite field F(p) is represented by the set $\{0, 1, \ldots, p-1\}$ of least non-negative residues modulo p.

In other words, a participant chooses elliptic curve E over field F(p) for which the cardinality of the group of points of the curve has a prime divisor q that is of the same order of magnitude as p, and such that q does not divide $p^m - 1$ for any positive integer m with $m*(\ln(m*\ln(p)))^2 \leq 0.02*(\ln(p))^2$. This provides sufficient security to protect against the Tate pairing, which is also sufficient to protect against the Weil pairing. The group cardinality is seen to be needed to provide sufficient security.

The elliptic curve E defines an integer d that depends on the equation satisfied by E, according to Table 1. In Table 1, d is such that −d equals the discriminant Δ of the endomorphism ring of E, which is useful in proving properties of interest in the present invention.

TABLE 1

| curve | d |
|---|---|
| $y^2 = x^3 + 0 x + 16$ | 3 |
| $y^2 = x^3 - 270 x - 1512$ | 8 |
| $y^2 = x^3 - 35 x - 98$ | 7 |
| $y^2 = x^3 - 9504 x - 365904$ | 11 |
| $y^2 = x^3 - 608 x + 5776$ | 19 |
| $y^2 = x^3 - 13760 x + 621264$ | 43 |
| $y^2 = x^3 - 117920 x + 15585808$ | 67 |
| $y^2 = x^3 - 34790720 x + 78984748304$ | 163 |

Since there are eight choices for the value of d, the choice of d can be specified by a three bit number. Specifically, three bits represent numbers $\{0, 1, \ldots, 7\}$ which correspond to the eight choices listed in Table 1.

Furthermore, prime number p and elliptic curve E define a pair of intermediate integers a and b, depending on the equation satisfied by elliptic curve E, according to Table 2.

TABLE 2

| curve | constraints on integers a, b |
|---|---|
| $y^2 = x^3 + 0x + 16$ | $p \equiv 1 \mod 3$ |
| | $a \equiv 1 \mod 3$ |
| | $b \equiv 0 \mod 3$ |
| | $a^2 + 3b^2 = 4p$ |
| $y^2 = x^3 - 270x - 1512$ | if $p \equiv 3 \mod 16$, then $a \equiv 1 \mod 4$ |
| | if $p \equiv 11 \mod 16$, then $a \equiv 3 \mod 4$ |
| | $a^2 + 2b^2 = p$ |
| all others | $a \neq 1$ |
| | $a^2 + db^2 = 4p$ |

Given prime number p and intermediate integer a, the cardinality $|E(F(p))|$ of the group of points $E(F(p))$ of elliptic curve E over field $F(p)$ is a simple closed formula as given in Table 3 where $j(a,d)=1$ when 2a is a square modulo d and $j(a,d)=-1$ when 2a is not a square modulo d, with d corresponding to the curve in Table 1. Thus, the software and runtime needed by each participant to count group cardinalities is straightforward enough for the present cryptosystem to be feasible.

TABLE 3

| curve | group cardinality |
|---|---|
| $y^2 = x^3 + 0x + 16$ | $|E(F(p))| = p + a + 1$ |
| $y^2 = x^3 - 270x - 1512$ | $|E(F(p))| = p - 2a + 1$ |
| $y^2 = x^3 - 9504x - 365904$ | $|E(F(p))| = p + j(a,11)^* a + 1$ |
| all others | $|E(F(p))| = p - j(a,d)^* a + 1$ |

Because of the simplicity of the formulas for the cardinality $|E(F(p))|$ in Table 3, no complicated software or lengthy runtimes are required to generate a proper finite field and elliptic curve. When elliptic curve E satisfies any of the first three equations of the predetermined set of Weierstraβ model equations, then the group cardinality always has a non-trivial divisor c, as specified in Table 4.

TABLE 4

| curve | fixed divisor c |
|---|---|
| $y^2 = x^3 + 0x + 16$ | 9 |
| $y^2 = x^3 - 270x - 1512$ | 2 |
| $y^2 = x^3 - 35x - 98$ | 8 |
| all others | 1 |

The prime number p and elliptic curve E are selected so that the cardinality $|E(F(p))|$ is given by a simple closed formula, $|E(F(p))|/c=(f^*q)$, with positive integer $f \leq 32$, q prime. This selection makes the Discrete Logarithm problem in $E(F(p))$ sufficiently difficult to provide adequate security, when prime number p is chosen to be sufficiently large.

Let $\otimes$ denote scalar multiplication in $E(F(p))$, that is, for a positive integer k and $x \in E(F(p))$, $k \otimes x \in E(F(p))$ denotes the k-term sum $x \oplus x \oplus \ldots \oplus x$, where $\oplus$ denotes the group operation in $E(F(p))$. If k is negative, $k \otimes x \in E(F(p))$ is defined as the negation $-(|k| \otimes x) \in E(F(p))$ of the point $|k| \otimes x$. If k is equal to zero, $k \otimes x$ is the identity O in $E(F(p))$.

Given prime numbers p and q and elliptic curve E, a point Q in $E(F(p))$ of order q can be found by looking for a random point P in $E(F(p))$ such that $Q=(c^*f) \otimes P$ in $E(F(p))$ has order q. For $d=3$, $Q=(3^*f) \otimes P$ instead of $(9^*f) \otimes P$ because the order 9 subgroup is not cyclic. The point Q has order q in $E(F(p))$ if $Q \neq O$; if $Q=O$, then it is necessary to select a different random point P in $E(F(p))$ and try again.

After p, E, q and Q are selected, the public and private key is determined as follows. First, randomly select a positive integer $m<q$, with m being the private key, also referred to as the secret key. Next, compute the point $G=(m \otimes Q) \in E(F(p))$. The public key consists of the five-tuple (p, E, q, Q, G), and the secret key is the integer m.

An important aspect of the present invention is how to find prime numbers p, q, elliptic curve E and point Q having the desirable properties presented above. Typically, one would expect to let intermediate integers a and b be defined by prime number p, but in one embodiment of the present invention, the pair of intermediate integers a and b is used to define prime number p. As discussed in detail below, each participant randomly selects a bitstring s having a number of bits equal to security parameter B. The randomly selected bitstring s is concatenated with the participant's unique bitstring ID to form a concatenated bitstring (ID||s) which is then mapped by mapping functions to ultimately obtain intermediate integers a, b, which satisfy not only the conditions in one of the rows of Table 2, thereby determining the value of integer d, but also the security requirements set forth above. After values are obtained for (ID, s, b, d), it is straightforward to obtain a portion of the public key (p, E, q, Q), and then the entire public key.

Determination of prime numbers p, q, elliptic curve E and point Q by each participant will now be discussed.

Let it be assumed that each participant in the system has a unique bitstring ID that identifies that participant and that is recognized by all other participants in the system. In some embodiments, the bitstring ID includes an encoding of descriptive data for the participant, such as name, date of birth, address, social security number, bank account number, personnel number, system specific login name and so on.

Let B be an integer valued security parameter. A useful value for B is in the range from 85 to 150, with lower values indicating minimally acceptable security and higher values indicating high security. The value for security parameter B is known system-wide.

Let Bs and Bb be two other integer valued security parameters, for example, Bs=30 and Bb=16. The values for Bs and Bb may be independently selected by each participant.

Let R1 and R2 be two different mapping functions that map strings of arbitrary length to B-bit positive integers, and let R3 be a mapping function that maps strings of arbitrary length to (2B)-bit positive integers. Mapping functions R1, R2, R3 can be defined using, for example, hash functions. Mapping functions R1, R2, R3 are known system-wide. If the devices to which mapping functions R1, R2, R3 are known are tamperproof devices, then the functions R1, R2, R3 can be considered confidential. An attacker without a cryptosystem device therefore cannot obtain (p, E, q, Q) even if given (ID, s, b1) as resulting from the participant setup procedure set forth in FIG. 5, which enhances security. An attacker with a cryptosystem device may be able to compute (p, E, q, Q), but will have difficulty extracting these values from a tamperproof device.

Figure 5:
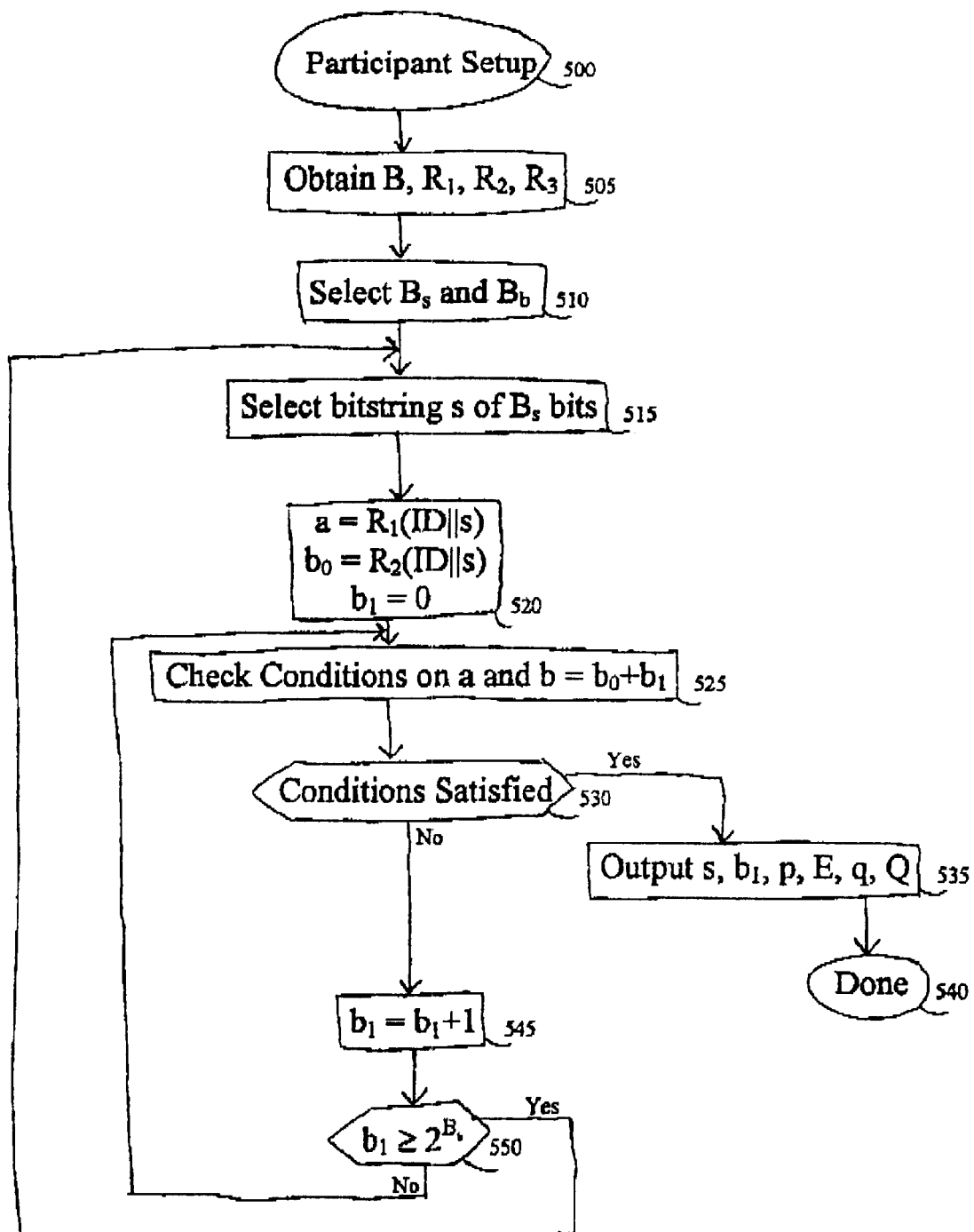
FIG. 5 shows a flow chart for Participant Setup.

FIG. 5 shows a flow chart for Participant Setup. FIG. 5 depicts how a participant obtains part of its public key, namely (p, E, q, Q). The remaining part, G, is obtained as above, namely, $G = (m \otimes Q) \in E(F(p))$.

At step 505, the value for security parameter B and mapping functions R1, R2, R3 are obtained. At step 510, the participant's cryptosystem selects values for security parameters Bs and Bb. At step 515, the participant's cryptosystem randomly selects a bitstring s having Bs bits. At step 520, the participant's cryptosystem applies the mapping functions R1 and R2 to the concatenation of its identity ID and the bitstring s to obtain two positive B-bit integers a=R1(ID∥s) and b0=R2(ID∥s), and also initializes an integer b1, b1=0. Let b=b0+b1. At step 525, the participant's cryptosystem checks if conditions on a and b are satisfied, as set forth in FIG. 6. At step 530, the participant's cryptosystem determines whether the result of the check is that conditions are satisfied. If so, at step 535, the cryptosystem outputs the values s, b1, p, E, q and Q and terminates. If not, at step 545, the participant's cryptosystem increments b1, and, at step 550, checks whether the incremented b1 is too big, that is, $b1 \geq 2^{Bb}$.

If the incremented b1 is appropriately small, then the participant's cryptosystem returns to step 525 to recompute b as b0+b1 and to check conditions on a and b. If the incremented b1 is too big, then the participant's cryptosystem returns to step 515 to select a new bitstring s. Because of the Prime Number Theorem, the procedure in FIG. 5 must terminate. Practically, the procedure of FIG. 5 requires at most a few minutes runtime on readily available microprocessors such as an Intel Pentium.

Figure 6:
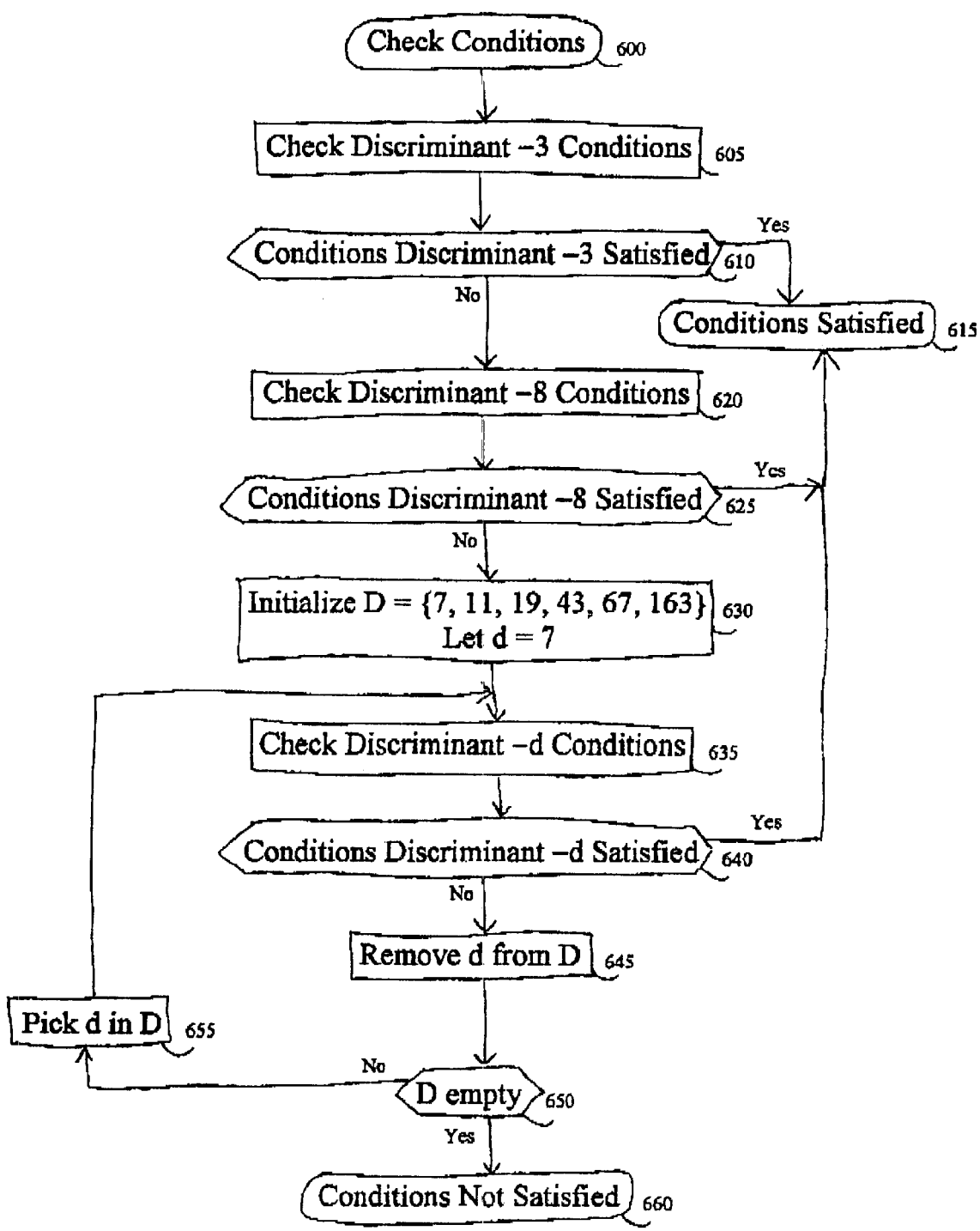
FIG. 6 shows a flow chart for checking conditions on the pair of intermediate integers a and b.

FIG. 6 shows a flow chart for checking conditions on the pair of intermediate integers a and b.

Figure 7:
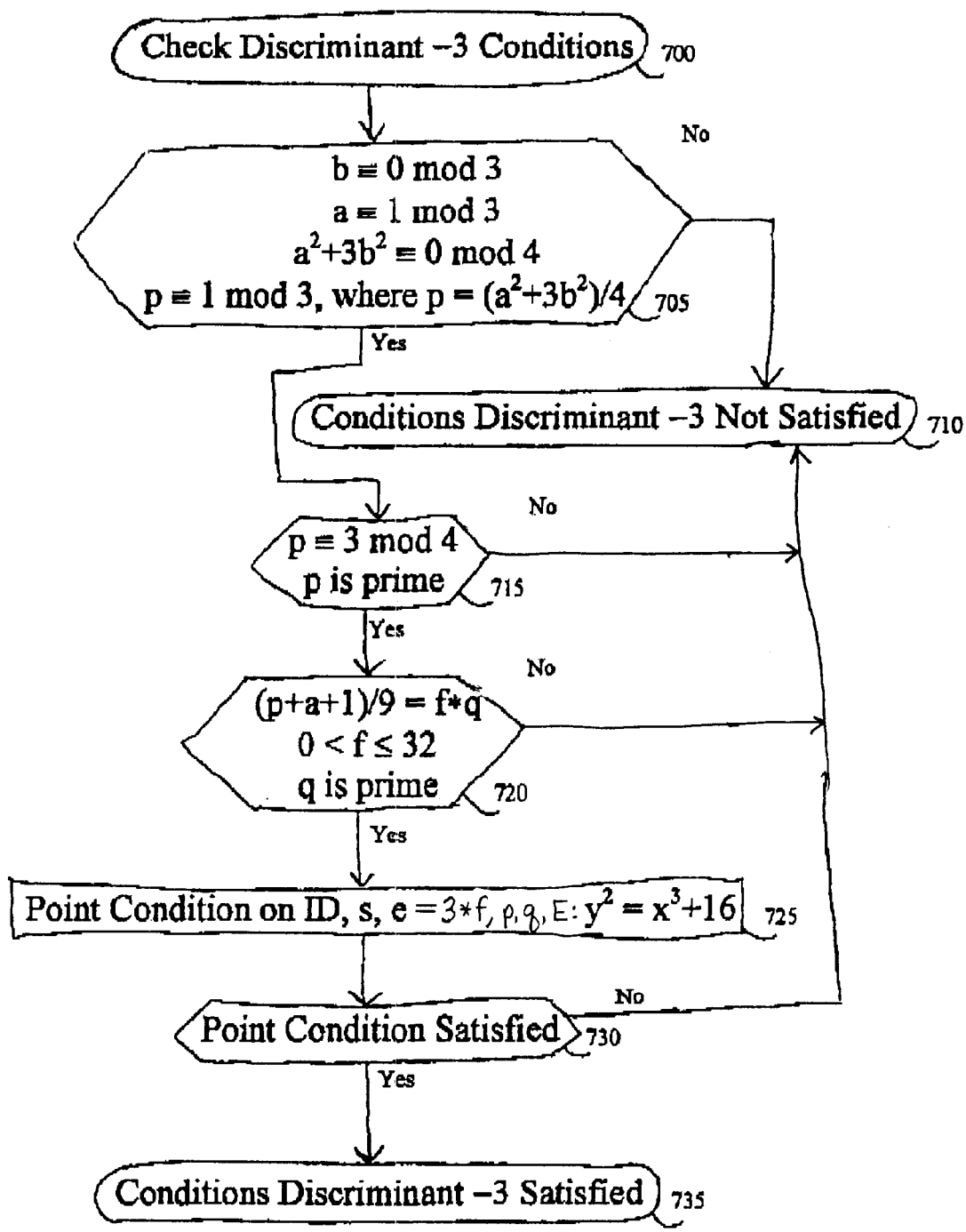
FIG. 7 shows a flow chart for checking whether the intermediate integers a and b satisfy the condition for discriminant −3.

At step 605, the participant's cryptosystem checks whether the intermediate integers a and b satisfy the condition for discriminant −3, as set forth in FIG. 7. At step 610, the result of the check in step 605 is evaluated. If the conditions for discriminant −3 are satisfied, then at step 615, the procedure terminates with a positive result.

Figure 8:
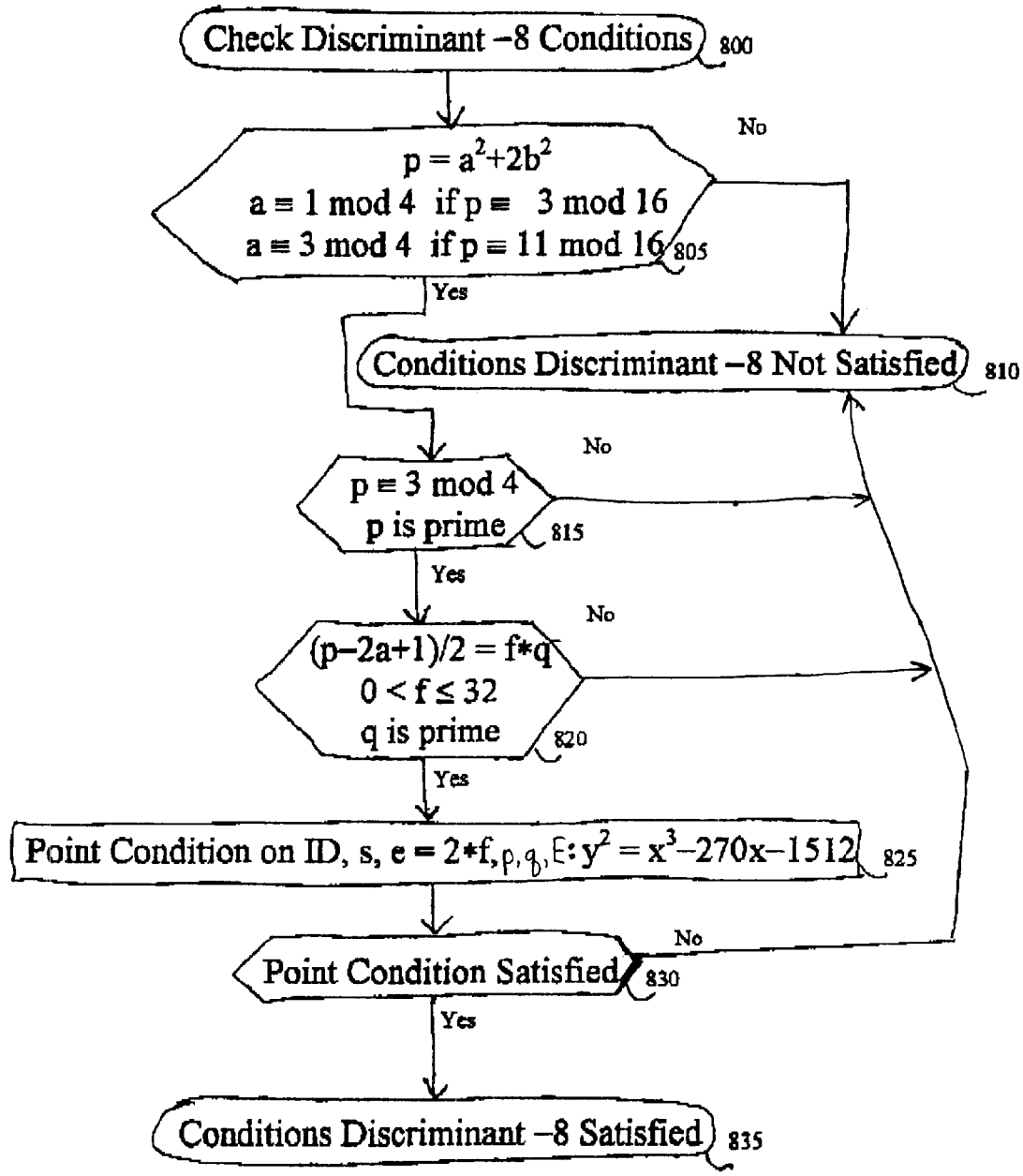
FIG. 8 shows a flow chart for checking whether the intermediate integers a and b satisfy the condition for discriminant −8.

If the conditions for discriminant −3 are not satisfied, then at step 620, the participant's cryptosystem checks whether the intermediate integers a and b satisfy the condition for discriminant −8, as set forth in FIG. 8. At step 625, the result of the check in step 620 is evaluated. If the conditions for discriminant −8 are satisfied, then at step 615, the procedure terminates with a positive result.

If the conditions for discriminant −8 are not satisfied, then at step 630, the participant's cryptosystem initializes the set D as {7, 11, 19, 43, 67, 163} and initializes the integer d as d=7, which is seen to be the first element in the set D. At step 635, the participant's cryptosystem checks whether the intermediate integers a and b satisfy the condition for discriminant −d, as set forth in FIG. 9. At step 640, the result of the check in step 635 is evaluated. If the conditions for discriminant −d are satisfied, then at step 615, the procedure terminates with a positive result.

If the conditions for discriminant −d are not satisfied, then at step 645, the participant's cryptosystem removes d from D, and at step 650, checks whether there are any values remaining in the set D. If there are values remaining, at step 655, the cryptosystem sets d to a value remaining in the set D, and returns to step 635.

If the set D is empty, then at step 660, the cryptosystem terminates with a negative result, namely, the intermediate integers a and b do not satisfy the conditions required for the present invention.

FIG. 7 shows a flow chart for checking whether the intermediate integers a and b satisfy the condition for discriminant −3.

At step 705, the participant's cryptosystem checks whether the conditions set forth in the first case of Table 2 are satisfied, namely, if a≡1 mod 3, b≡0 mod 3, $a^2+3b^2$ is divisible by 4, and if the quotient $p=(a^2+3b^2)/4$ has remainder 1 upon division by 3. If any of these conditions are not satisfied, then at step 710, the procedure returns with a negative result.

If the aforementioned conditions of Table 2 are satisfied, then at step 715, the cryptosystem checks if the remainder of p upon division by 4 is 3, and if p is a prime number. If any of these conditions are not satisfied, then at step 710, the procedure returns with a negative result. The primality of p is tested using a probabilistic compositeness test wherein if p can be proved to be composite, then p is not prime, and if the proof of compositeness for p fails, then p is assumed to be prime.

If the aforementioned conditions are satisfied, then at step 720, the cryptosystem checks if (p+a+1)/9=f*q, for a positive integer f≦32 and a prime number q. If any of these conditions are not satisfied, then at step 710, the procedure returns with a negative result.

Figure 10:
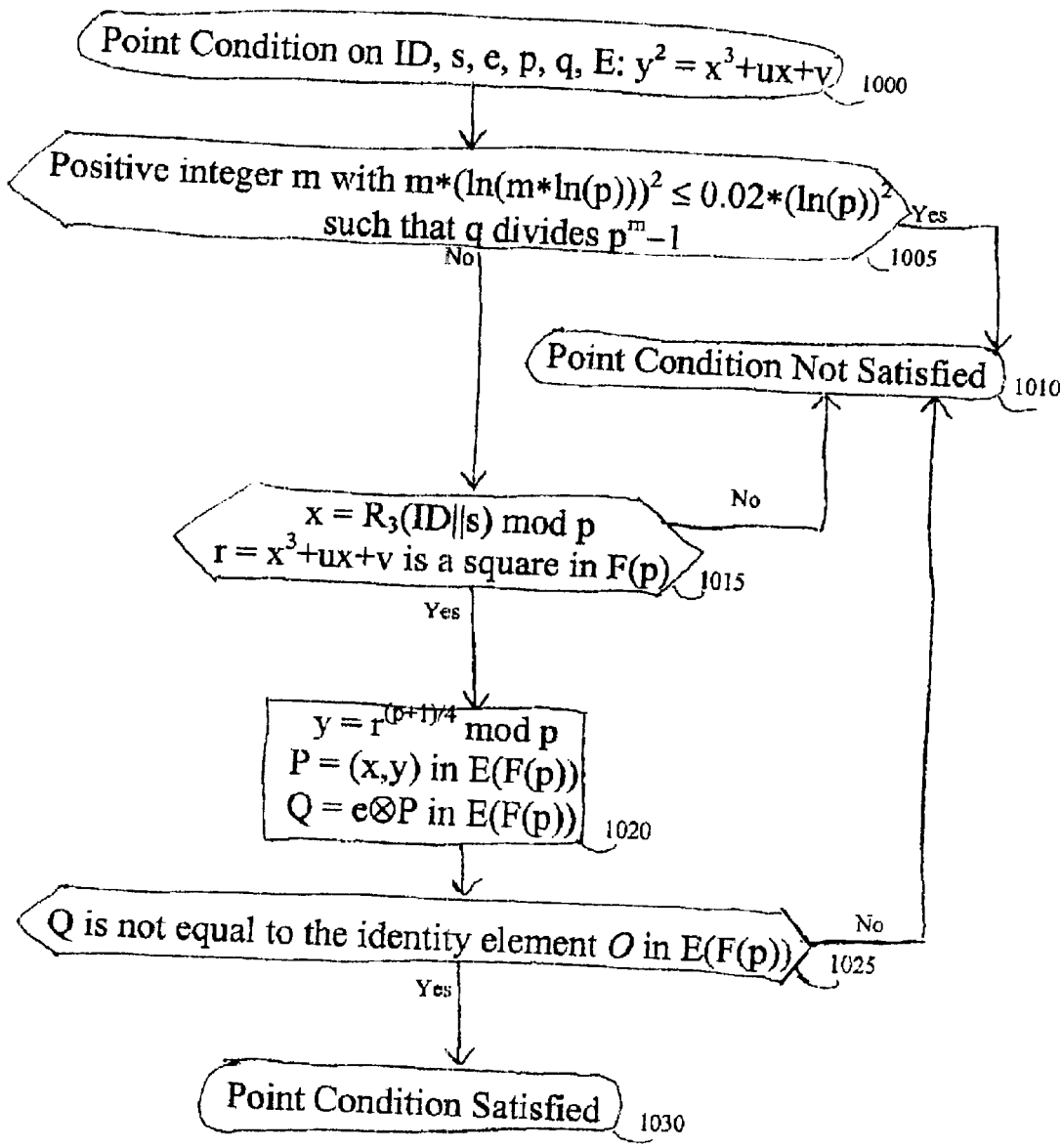
FIG. 10 shows a flow chart for checking whether the point condition is satisfied for ID, s, e, p, q and E.

If the aforementioned conditions are satisfied, then at step 725, the cryptosystem checks whether the point condition, as set forth in FIG. 10, is satisfied for ID, s, with s, e=3*f, p, q and E given by $y^2=x^3+x+16$, the first of the elliptic curve equations set forth above.

At step 730, the cryptosystem evaluates the result of the check in step 725. If the result is negative, then at step 710, the procedure returns with a negative result.

If the result is positive, then at step 735, the procedure returns the result that the conditions for discriminant −3 are satisfied, with p, E, q, Q, being as returned by the point condition procedure of FIG. 10.

FIG. 8 shows a flow chart for checking whether the intermediate integers a and b satisfy the condition for discriminant −8.

At step 805, the participant's cryptosystem obtains $p=a^2+2b^2$ and checks whether the conditions set forth in the second case of Table 2 are satisfied, namely, if, when p≡3 mod 16, then a≡1 mod 4, and if, when p≡11 mod 16, then a≡3 mod 4. If any of these conditions are not satisfied, then at step 810, the procedure returns with a negative result.

If the aforementioned conditions of Table 2 are satisfied, then at step 815, the cryptosystem checks if the remainder of p upon division by 4 is 3, and if p is a prime number. If any of these conditions are not satisfied, then at step 810, the procedure returns with a negative result.

If the aforementioned conditions are satisfied, then at step 820, the cryptosystem checks if (p−2a+1)/2=f*q, for a positive integer f≦32 and a prime number q. If any of these conditions are not satisfied, then at step 810, the procedure returns with a negative result.

If the aforementioned conditions are satisfied, then at step 825, the cryptosystem checks whether the point condition, as set forth in FIG. 10, is satisfied for ID, s, with s, e=2*f, p, q and E given by $y^2=x^3-270x-1512$, the second of the elliptic curve equations set forth above.

At step 830, the cryptosystem evaluates the result of the check in step 825. If the result is negative, then at step 810, the procedure returns with a negative result.

If the result is positive, then at step 835, the procedure returns the result that the conditions for discriminant −8 are satisfied, with p, E, q, Q, being as returned by the point condition procedure of FIG. 10.

Figure 9:
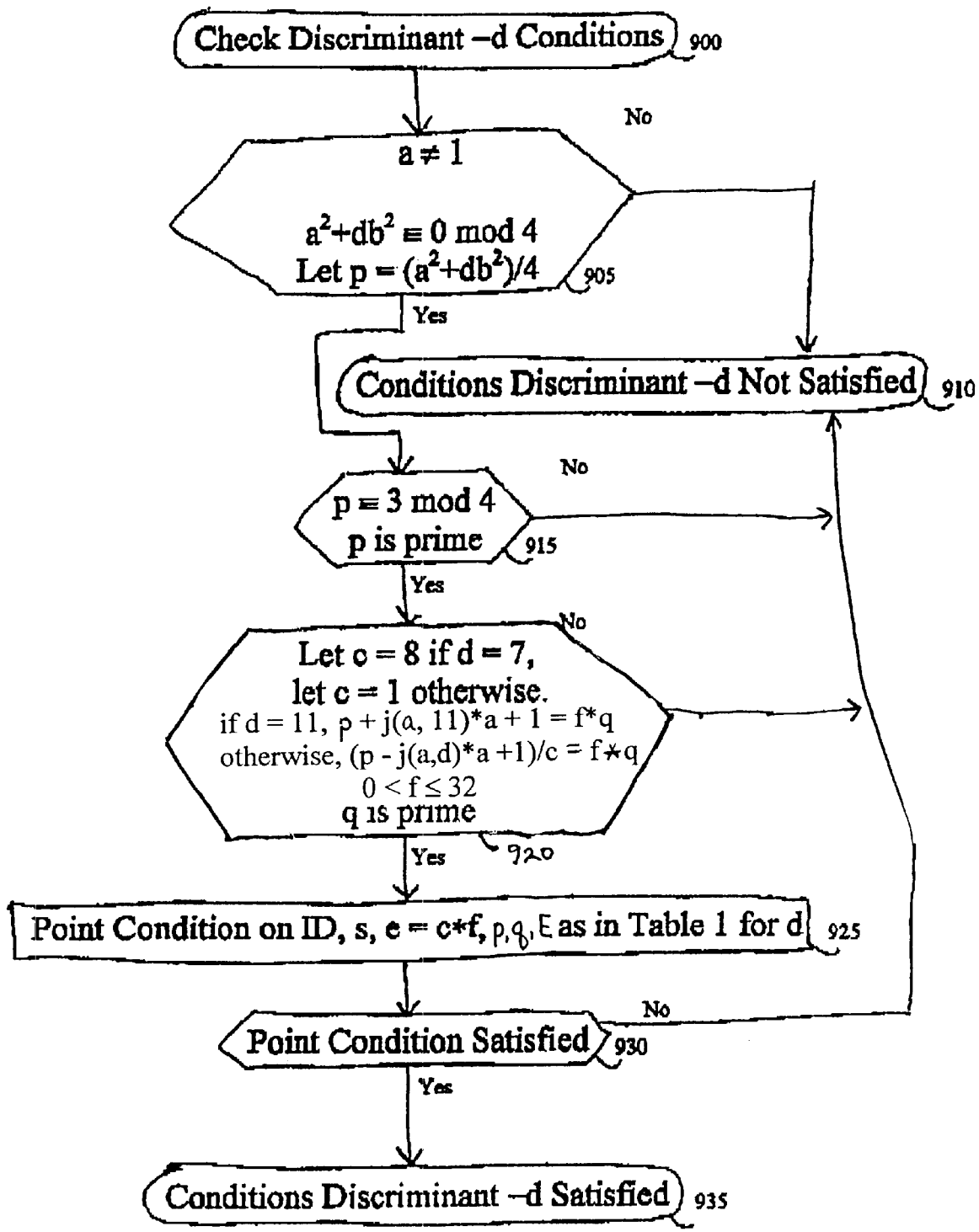
FIG. 9 shows a flow chart for checking whether the intermediate integers a and b satisfy the condition for discriminant −d, d being one of (7, 11, 19, 43, 67, 163)

FIG. 9 shows a flow chart for checking whether the intermediate integers a and b satisfy the condition for discriminant −d, d being one of (7, 11, 19, 43, 67, 163).

At step 905, the participant's cryptosystem checks whether the conditions set forth in the third case of Table 2 are satisfied, namely, if a≠1 and if $a^2+db^2=4p$ for an integer p. If any of these conditions are not satisfied, then at step 910, the procedure returns with a negative result.

If the aforementioned conditions of Table 2 are satisfied, then at step 915, the cryptosystem checks if the remainder of p upon division by 4 is 3, and if p is a prime number. If any of these conditions are not satisfied, then at step 910, the procedure returns with a negative result.

If the aforementioned conditions are satisfied, then at step 920, the cryptosystem checks if $(p+j(a,11)*a+1)/c=f*q$ if $d=11$ and if $(p-j(a,d)*a+1)/c=f*q$ otherwise, where $j(a, d)=1$ when $2a$ is a square modulo $d$ and $j(a,d)=-1$ when $2a$ is not a square modulo $d$, for a positive integer $f \leq 32$ and a prime number $q$, with $c=8$ for the case of $d=7$, and $c=1$ for all other cases. If any of these conditions are not satisfied, then at step 910, the procedure returns with a negative result.

If the aforementioned conditions are satisfied, then at step 925, the cryptosystem checks whether the point condition, as set forth in FIG. 10, is satisfied for ID, s, with s, $e=2*f$, p, q and E given by the third through eighth of the elliptic curve equations set forth above, based on the value for d.

At step 930, the cryptosystem evaluates the result of the check in step 925. If the result is negative, then at step 910, the procedure returns with a negative result.

If the result is positive, then at step 935, the procedure returns the result that the conditions for the appropriate one of the selected discriminants are satisfied, with p, E, q, being as returned by the point condition procedure of FIG. 10.

FIG. 10 shows a flow chart for checking whether the point condition is satisfied for ID, s, e, p, q and E, where E is specified by the elliptic curve equation $y^2=x^3+ux+v$.

At step 1005, the participant's cryptosystem tries to find a positive integer m such that two constraints are satisfied: first, that $m*(\ln(m*\ln(p)))^2 \leq 0.02*(\ln(p))^2$ and second, that q divides $p^m-1$. Specifically, the cryptosystem checks if q divides $p^m-1$ for $m=1, 2, \ldots$ in succession until $m*(\ln(m*\ln(p)))^2 > 0.02*(\ln(p))^2$. If an m satisfying these two constraints is found, then the point condition is not satisfied, and the procedure returns at step 1010 with a negative result.

If no such m is found, then at step 1015, the cryptosystem obtains $x=R3(ID\|s) \bmod p$ and checks whether $r=x^3+ux+v$ is a square in $F(p)$, with u and v being the parameters of the elliptic curve equations set forth above. If r, as defined, is not a square in $F(p)$, then the point condition is not satisfied, and the procedure returns at step 1010 with a negative result.

If r, as defined, is a square in $F(p)$, then at step 1020, the cryptosystem obtains one of the square roots of r as $y=r^{(p+1)/4} \bmod p$ in $F(p)$, forms the point $P=(x, y)$ in $E(F(p))$ and multiplies P by the scalar value e in the group $E(F(p))$ to produce the point $Q=e \otimes P$ in $E(F(p))$.

At step 1025, the cryptosystem checks whether the point Q does not have order q in $E(F(p))$, that is, whether Q is equal to the identity element O in $E(F(p))$. If the order of Q is not equal to q, then the point condition is not satisfied, and the procedure returns at step 1010 with a negative result.

If the point Q has order q in $E(F(p))$, then the point condition is satisfied and the procedure returns at step 1030 with a positive result.

An important aspect of the present invention is that, given B, R1, R2, R3, ID, s, b1 and d, any participant can reconstruct (p, E, q, Q). A public key reconstruction procedure is presented below. Since B, R1, R2, R3, are known to all participants, it is only necessary to obtain the values (ID, s, b1, d) to construct the (p, E, q, Q) portion of another participant's public key. It will be appreciated that communication with a participant requires identifying information ID even without the present cryptosystem.

The remaining portion of the public key, G in $E(F(p))$, must be sent to any participant wishing to communicate with the participant using G. Specifying the x-coordinate of G reduces the possibilities for the y-coordinate of G down to two: a larger number and a smaller number. Thus, it will be appreciated that, to represent G, it is necessary to send only the x-coordinate of G and a single bit indicating the larger or smaller y-coordinate.

Let $L(x)$ denote the binary length of a non-negative integer x, that is, the number of bits required for a binary representation of x.

Using the Weierstraβ model, $y_0(X)$ and $y_1(X)$ for any X can be found with a square root computation in $F(p)$, such that $(y_i(X))^2=X^3+uX+v$, for $i=1, 2$. When $p \equiv 3 \bmod 4$, the square root of a square r in $F(p)$ can be found quickly as $r^{1/2}=r^{(p+1)/4}$, which allows reduction of the $2L(p)$ bits required to describe a point on the curve to $1+L(p)$ bits by specifying the X-coordinate and a single bit indicating $y_0(X)$ or $y_1(X)$.

Public key size will now be discussed. The public key for a participant consists of (p, E, q, Q, G). Reconstruction of a public key requires only (ID, s, b1, d, G). The length of ID may be any number of bits, as selected by a participant; this information is required to communicate with the participant, under any scheme, and so should not be counted in the size of the participant's public key. The bit lengths of s and b1 are Bs and Bb, respectively, as selected in step 510 of FIG. 5, and may be, for example, Bs=30 and Bb=16. There are eight choices for d, so three bits are required to represent d. The number of bits required for G is $L(p)+1$. The prime p obtained in the participant setup procedure described above has a length $L(p)$ close to $2*B$, with B being the integer valued security parameter introduced above. Thus, the amount of information from which a public key of a party of known ID can be derived is $30+16+3+L(p)+1=50+L(p)$ bits.

When the present cryptosystem is used with certification, the message to be certified has a length of $L(ID)+50+L(p)$ bits, which is relatively short in comparison with conventional cryptosystems. As an illustration, the length of the public key (p, E, q, Q, G), if represented conventionally and as created by a conventional central authority, would be expected to be $L(p)+L(E)+L(q)+L(Q)+L(G)=L(p)+(2*L(p))+($ at least $L(p)/2)+(L(p)+1)+(L(p)+1)=$ at least $5.5*L(p)+2$ bits. If this conventional representation were used, the cryptographic overhead information would have a length of at least $L(ID)+5.5*L(p)+2$ bits. It can readily be seen that the reduction in cryptographic information length is the difference between the length in a conventional scheme and the length in the present cryptosystem, (at least $L(ID)+5.5*L(p)+2)-(L(ID)+50+L(p))=$ at least $4.5*L(p)-48$ bits. Typically, the prime p has a length of around 170 bits, although this could be another value, for a savings of 717 bits.

The reduced bit length attained by the present invention is advantageous in at least transmission, that is, more efficient use of bandwidth since less bandwidth is needed for cryptographic overhead, and storage, since reconstruction is very easy, as shown below.

In the conventional scheme, where a central authority creates the (p, E, q, Q) portion of a participant's public key, the length of the message to be certified is $L(ID)+L(p)+1$. In the present cryptosystem, the length of the message to be certified is $L(ID)+L(p)+50$, which is only 49 bits more, yet achieves much higher security.

There can be redundancy in s and b1, to make creation of fraudulent public key and ID pairs more difficult.

Figure 11A:
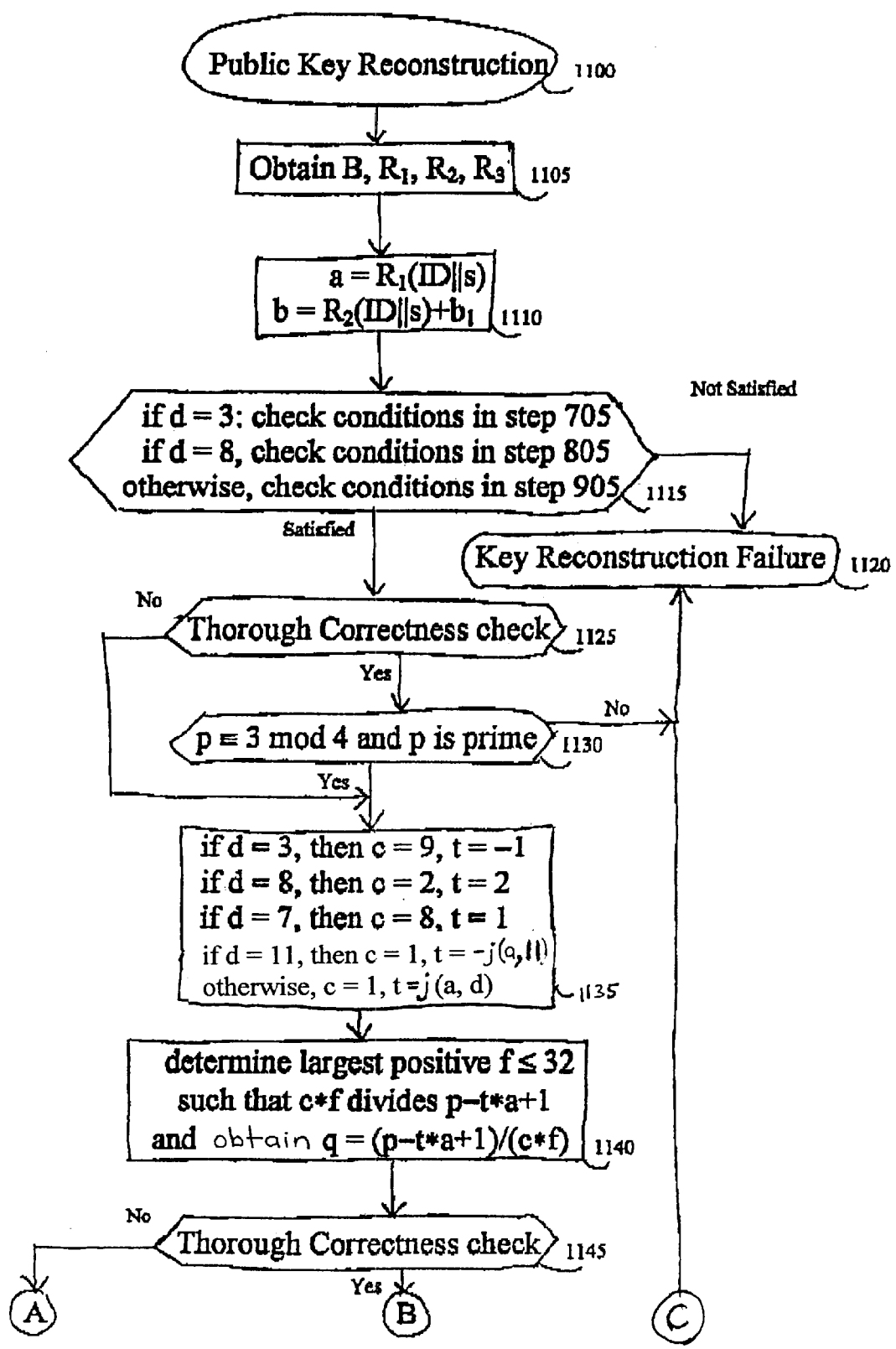
FIGS. 11A and 11B are a flowchart of a public key reconstruction according to an embodiment of the present invention.
Figure 11B:
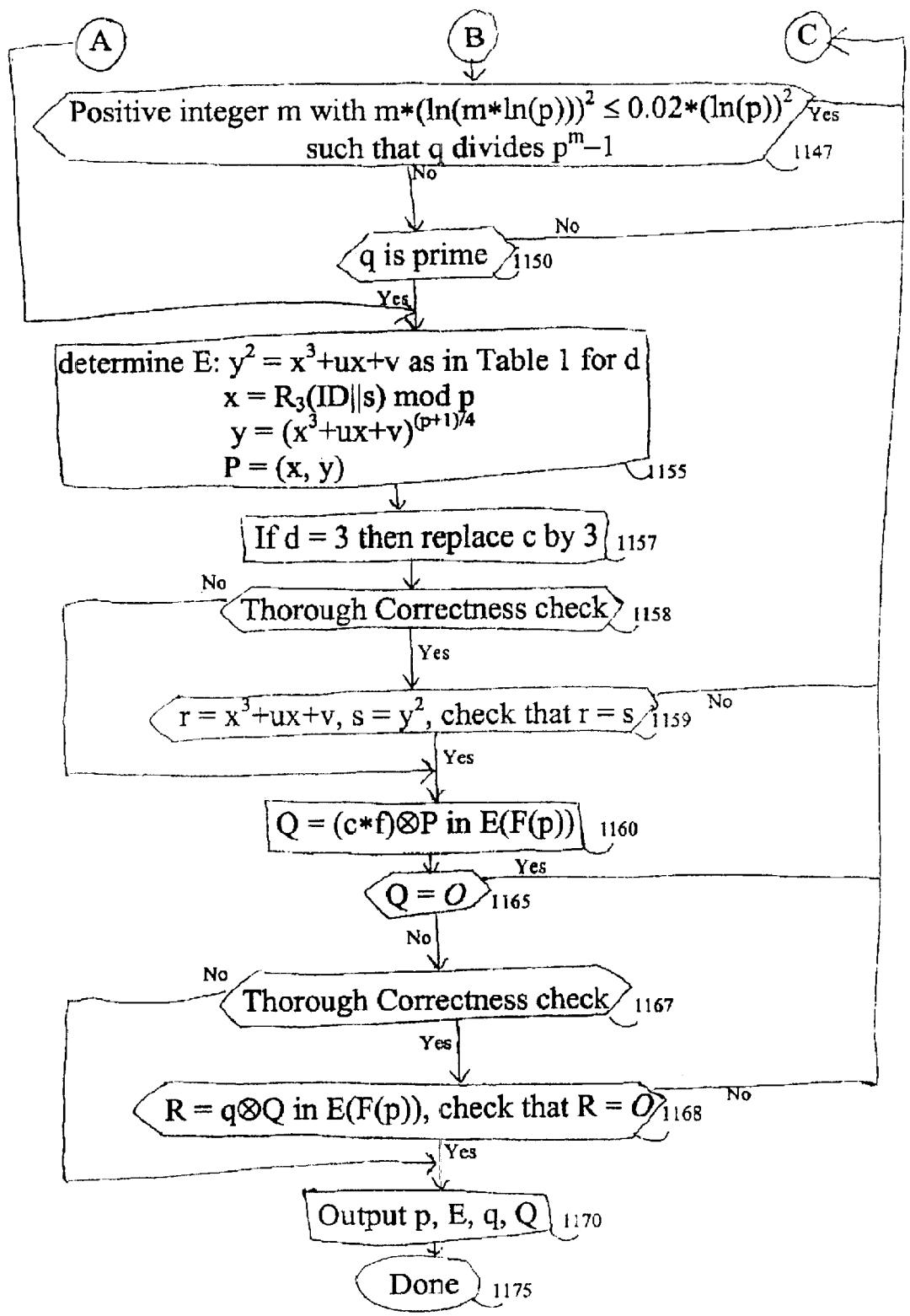

An embodiment of a procedure for public key reconstruction is set forth in FIGS. 11A and 11B, which are referred to collectively as FIG. 11. The procedure depicted in FIG. 11 demonstrates that, given a participant's identifying information ID and the values s, b1 and d, E corresponding to d according to Table 1, and given B, R1, R2, R3, it is very easy to construct the participant's (p, E, q, Q) values.

At step 1105, the value B and the functions R1, R2, R3 are obtained. At step 1110, the value a is obtained as $a=R1(ID\|s)$ and the value b is obtained as $b=R2(ID\|s)+b1$.

At step 1115, the conditions on a and b are checked; as before, the specific conditions depend on the value of d. While checking conditions as in steps 705, 805 or 905, as described in step 1115, p is computed as in steps 705, 805 or 905, respectively.

If the result of the condition check at step 1115 is negative, then at step 1120, the public key reconstruction procedure fails.

If the result of the condition check at step 1115 is positive, then at step 1125 it is determined whether a thorough correctness check is required. If not, then the cryptosystem advances to step 1135. If a thorough correctness check is required, then at step 1130, the cryptosystem checks whether p is a prime number with remainder equal to 3 upon division by 4 using, for example, a probabilistic compositeness test. A thorough correctness check may be carried out by the party that creates a certificate for the public key: before certifying user dependent information (ID, s, b1, G) needed to reconstruct the public key, the certifying party performs the Public Key Reconstructions with a Thorough Correctness check. If, and only if, the public key can be reconstructed correctly and passes all thorough correctness tests, does the certifying party provide the desired certificate. Other parties that receive the certified user dependent information (ID, s, b1, G) need not test p and q for primality because of their correctness certification. If the check at step 1130 is negative, then at step 1120, the public key reconstruction procedure fails.

At step 1135, depending on the value of d, values are assigned to c and t. At step 1140, the cryptosystem determines the largest positive integer $f \leq 32$ such that $c^*f$ divides $(p-t^*a+1)$, and q is obtained as $q=(p-t^*a+1)/(c^*f)$.

At step 1145, it is again determined whether a thorough correctness check is required using the same criteria as in step 1125. If not, then the cryptosystem advances to step 1155. If a thorough correctness check is required, then at step 1147 it is checked that there is no integer m such that $m^*(\ln(m^*\ln(p)))^2 \leq 0.02 \ *(\ln(p))^2$ and such that q divides $p^m-1$. If the test at step 1147 fails, then at step 1120, the public key reconstruction procedure fails. If the test at step 1147 is positive, then at step 1150, the primality of q is checked. If the check at step 1150 is negative, then at step 1120, the public key reconstruction procedure fails.

At step 1155, the proper one of the elliptic curves E is selected based on the value for d, in accordance with Table 1. The value x is obtained as R3(ID∥s) mod p, the value y is obtained as $(x^3+ux+v)^{(p+1)/4}$ in F(p), and P is set to (x, y).

At step 1157, it is determined whether d=3, and if so, then c is replaced by 3, because the order 9 subgroup is not cyclic.

At step 1158 it is determined whether a Thorough Correctness check is required, using the same criteria as in step 1125. If not, the cryptosystem advances to step 1160. If a Thorough Correctness check is required, then at step 1159, values are obtained for $r=x^3+ux+v$ and $s=y^2$ and it is checked if r=s. If not, then at step 1120, the public key reconstruction procedure fails. If r=s, then the cryptosystem advances to step 1160. At step 1160, the point Q is obtained as (c*f)⊗P in E(F(p)). At step 1165, it is checked whether Q is the identity element O in E(F(p)); if so, then at step 1120, the public key reconstruction procedure fails.

If Q is not the identity element, then at step 1167 it is determined whether a Thorough Correctness check is required, using the same criteria as in step 1125. If not, then the cryptosystem advances to step 1170. If a Thorough Correctness check is required, then at step 1168 the point R in E(F(p)) is obtained as q⊗Q in E(F(p)) and it is checked if R is equal to the identity element O in E(F(p)). If so, then the cryptosystem advances to step 1170. If R is not the identity element, then at step 1120 the public key reconstruction procedure fails. If R is the identity element, then at step 1170, the values (p, E, q, Q) are output and the public key reconstruction procedure is terminated.

The only steps in the public key reconstruction procedure which require any substantial computation are the primality checks and the check whether R is the identity element O. Exclusive of these checks, the public key reconstruction procedure takes only milliseconds to execute on a conventional, widely available processor such as an Intel Pentium.

Examples of public keys generated according to the above-described method will now be discussed.

FIGS. 12A–12D provide respective sets of values for public keys (p, E, q, Q). In these examples, for the participant's ID, the binary (base 2) bitstring having decimal (base 10) representation 112233445566778899900 was arbitarily used, security parameters Bs=30 and Bb=8 were used, and the following mapping functions were used:

$$R1(x)=x^8 \bmod 2^B$$

$$R2(x)=(\text{reverse}(x))^8 \bmod 2^B$$

$$R3(x)=(\text{reverse}(x)\|x)^8 \bmod 2^{2B}$$

The bitstring x is in binary (base 2), for example "11001" corresponding to a decimal (base 10) value of "25". The function "reverse (x)" reverses the order of bits in a bitstring, for example, reverse (11001)=10011. The operator "∥" denotes concatenation of bitstrings, for example (10011 ∥ 11001)=1001111001. The examples in FIGS. 12A and 12B illustrate security parameter B=85, that is, a relatively low value, while the examples in FIGS. 12C and 12D illustrate security parameter B=150, that is, a relatively high value. Bitstring s is a different randomly chosen value in each example. All public keys (p, E, q, Q) were successfully reconstructed using the same mapping functions R1, R2, R3, participant's ID and the bitstring s and parameter b1 values set forth in the respective examples of FIGS. 12A–12D.

Once keys have been initialized in accordance with the present invention, the keys can be used in combination with any elliptic curve cryptosystem. In most conventional elliptic curve cryptosystems, a substantial portion of the runtime is devoted to computation of k⊗Q for a randomly selected k. In many implementations, this computation can be made faster if, for instance, the x-coordinate of Q has some known fixed value such as zero. If c=1, this is ensured by requiring that R3 yields zero. Also, if c>1, it may be required that R3 yields zero if d is other than 3, and compute (k*c)⊗P=k⊗Q, which leads to a considerable speed improvement. Similarly, for d=3, it may be required that R3 yields 1, although the saving obtained in this case is much smaller.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method for establishing a cryptographic system among participants, comprising:

selecting a curve E from a predetermined set of elliptic curves;

selecting a finite field;
selecting a secret key; and
obtaining a public key,
wherein the selecting of the curve E, the selecting of the finite field, the selecting of the secret key, and the obtaining of the public key are performed locally by each of the participants, and
wherein the predetermined set of elliptic curves are expressed as Weierstraß model equations.

2. The method of claim 1, wherein the predetermined set of elliptic curves is:

$$y^2=x^3+0x+16;$$
$$y^2=x^3-270x-1512;$$
$$y^2=x^3-35x-98;$$
$$y^2=x^3-9504x-365904;$$
$$y^2=x^3-608x+5776;$$
$$y^2=x^3-13760x+621264;$$
$$y^2=x^3-117920x+15585808;$$

and $$y^2=x^3-34790720x+78984748304.$$

3. The method of claim 1, wherein the obtaining of the public key further comprises:
selecting a bitstring s having a predetermined length based on a security parameter;
concatenating a bitstring ID and the bitstring s to form a concatenated bitstring, the bitstring ID unique among the participants;
computing an integer a by applying a first function to the concatenated bitstring;
computing an integer b by applying a second function to the concatenated bitstring; and
determining a prime number p based on the integer a and the integer b,
wherein the selecting of the bitstring s, the concatenating, the computing of the integer a, the computing of the integer b, and the determining of the prime number p are performed locally by each of the participants, and
wherein the integer a and the integer b satisfy security requirements and constraints dictated by the choice of the curve E.

4. The method of claim 3, wherein the public key also includes a prime number q of the same order of magnitude as the prime number p and a point Q of order q on the curve E, and wherein the obtaining of the public key further comprises:
determining the point Q using a simple computation.

5. The method of claim 4, wherein the step of determining the point Q includes:
computing a value x by applying a third function to the concatenated bitstring;
determining a value y based on using the value x in the curve E; and
performing a scalar multiplication on the point (x, y) to generate the point Q.

6. The method of claim 1, wherein the obtaining of the public key further comprises:
selecting an integer a and an integer b;
obtaining a prime number p as a function of the integer a and the integer b; and
forming the public key from the prime number p and the curve E,
wherein the selecting of the integer a and the integer b, the obtaining of the prime number, and the forming of the public key are performed locally by each of the participants, and wherein the integer a and the integer b are based on a bitstring ID unique among the participants, and
wherein the integer a and the integer b satisfy security requirements and constraints dictated by the choice of the curve E.

7. The method of claim 6, wherein the selecting of the integer a and the integer b further comprises:
mapping the bitstring ID to an integer a and an integer $b_0$ using mapping functions known to all participants.

8. The method of claim 7, wherein the selecting of the integer a and the integer b further comprises:
selecting a bitstring s having a predetermined length based on a security parameter; and
concatenating the bitstring ID and the bitstring s to form a concatenated bitstring.

9. The method of claim 7, wherein the selecting of the integer a and the integer b further comprises:
selecting an integer $b_1$ so that the integer a and the integer b, where $b=b_0+b_1$, satisfy a set of predetermined conditions for the prime number p and the curve E.

10. The method of claim 9, wherein the selecting of the integer $b_1$ further comprises:
iteratively evaluating different values for the integer $b_1$.

11. The method of claim 1, wherein the public key includes a prime number p which defines a field F(p) such that the cardinality of the group of points of the curve E over the field F(p) is given by a simple closed formula.

12. A method of reconstructing a public key for a participant in a cryptographic system, comprising:
forming intermediate integers a and b based on a unique ID for the participant;
obtaining a prime number p as a function of the intermediate integers a and b;
selecting a curve E from a predetermined set of elliptic curves;
picking a point Q on the curve E based on the unique ID for the participant; and
constructing the public key from the prime number p, the curve E, and the point Q.

13. The method of claim 12, wherein the predetermined set of elliptic curves are expressed as Weierstraß model equations.

14. The method of claim 13, wherein the predetermined set of elliptic curves is:

$$y^2=x^3+0x+16;$$
$$y^2=x^3-270x-1512;$$
$$y^2=x^3-35x-98;$$
$$y^2=x^3-9504x-365904;$$
$$y^2=x^3-608x+5776;$$
$$y^2=x^3-13760x+621264;$$
$$y^2=x^3-117920x+15585808;$$

and $$y^2=x^3-34790720x+78984748304.$$

15. The method of claim 12, wherein the forming of the intermediate integers a and b is also based on bitstrings s and $b_1$.

16. The method of claim 12, wherein the selecting of the curve E is also in accordance with an integer d.

17. The method of claim 12, wherein the picking of the point Q is also based on a bitstring s.

* * * * *